US011016183B2

(12) United States Patent
Gill et al.

(10) Patent No.: US 11,016,183 B2
(45) Date of Patent: May 25, 2021

(54) REAL TIME LIDAR SIGNAL PROCESSING FPGA MODULES

(71) Applicant: U.S.A, as represented by the Administrator of the National Aeronautics and Space Administration, Washington, DC (US)

(72) Inventors: Nathaniel A. Gill, Ellicott City, MD (US); Mark M. Giza, Kensington, MD (US)

(73) Assignee: United States of America as represented by the Administrator of NASA, Washington, DC (US)

(*) Notice: Subject to any disclaimer, the term of this patent is extended or adjusted under 35 U.S.C. 154(b) by 696 days.

(21) Appl. No.: 15/280,127

(22) Filed: Sep. 29, 2016

(65) Prior Publication Data

US 2018/0088216 A1    Mar. 29, 2018

(51) Int. Cl.
| | |
|---|---|
| *G01S 7/4861* | (2020.01) |
| *G01S 7/4865* | (2020.01) |
| *G01S 7/487* | (2006.01) |
| *G01S 13/89* | (2006.01) |
| *G01S 17/89* | (2020.01) |
| *G01S 17/42* | (2006.01) |
| *G01S 17/10* | (2020.01) |

(52) U.S. Cl.
CPC ............ *G01S 7/4861* (2013.01); *G01S 7/487* (2013.01); *G01S 7/4865* (2013.01); *G01S 17/10* (2013.01); *G01S 17/42* (2013.01); *G01S 17/89* (2013.01); *G01S 13/89* (2013.01)

(58) Field of Classification Search
CPC .......... G01S 17/10; G01S 17/89; G01S 13/89; G01S 7/4861; G01S 7/4865; G01S 7/487
See application file for complete search history.

(56) References Cited

U.S. PATENT DOCUMENTS

| | | | | |
|---|---|---|---|---|
| 6,115,113 A * | 9/2000 | Flockencier | .......... | G01S 7/4812 356/5.01 |
| 7,623,562 B2* | 11/2009 | Kang | ................. | H04B 1/71637 370/509 |
| 9,485,082 B1* | 11/2016 | Sun | ........................ | H04L 7/0025 |
| 2011/0085155 A1* | 4/2011 | Stann | ....................... | G01C 3/08 356/5.09 |

\* cited by examiner

*Primary Examiner* — Eric L Bolda
(74) *Attorney, Agent, or Firm* — Matthew F. Johnston; Bryan A. Geurts; Helen M. Gaius

(57) ABSTRACT

Aspects of the present disclosure involve a system and method for performing time of flight estimation of a laser pulse using a LiDAR signal processing. A plurality of digital waveforms are correlated to a transmitted pulse for time of flight estimation. Each of the plurality of digital waveforms can be correlated independently by a corresponding correlator in a plurality of correlators working in parallel. Each of the correlators can include signal processing modules for time of flight estimation including an interpolating filters and peak detect modules.

7 Claims, 3 Drawing Sheets

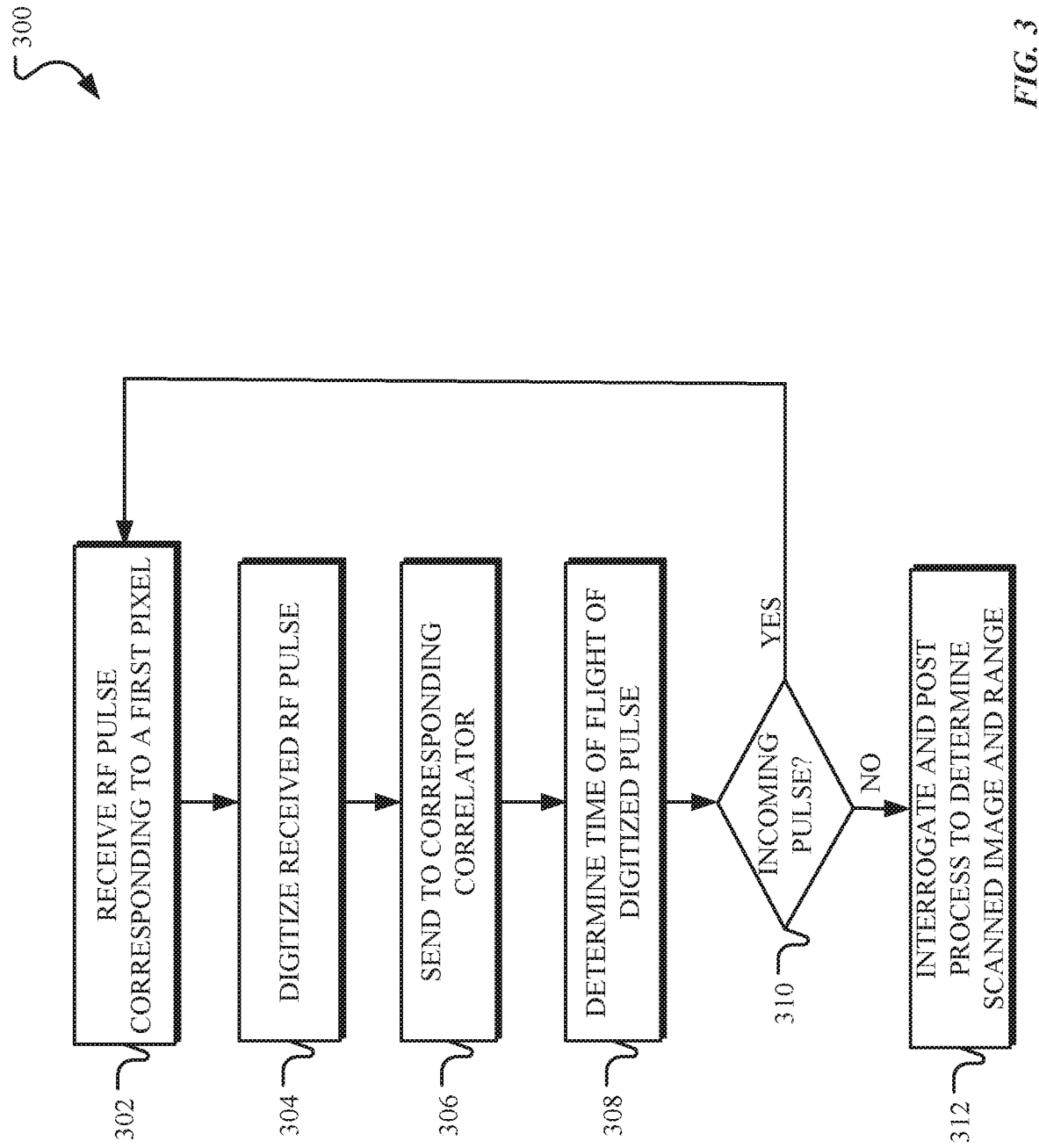

REAL TIME LIDAR SIGNAL PROCESSING FPGA MODULES

TECHNICAL FIELD

This disclosure relates generally to LiDAR signal processing, and more specifically to a method for performing time of flight estimation of a laser pulse using LiDAR signal processing.

BACKGROUND

Light Detection and Ranging (LiDAR) is a remote sensing technology that uses light pulses to measure ranges or distances of an object. It is a technology that has application in various fields including archeology, meteorology, bathymetry, etc. Further, the information extracted from these measurements can have many uses, including determining surface characteristics, creating elevation models, and even obtaining three-dimensional (3-D) images of an object at a distance. To determine the 3-D image of an object at a distance, time differences (or time of flight estimations) are determined between the transmission of laser light pulses and the reception of the reflected signals. Generally, conventional components used in providing these time of flight estimations can be slow, inaccurate, or too large to provide the capabilities required in applications like space exploration and military surveillance.

BRIEF SUMMARY

The present disclosure is directed to an apparatus and methods for performing time of flight estimation. The apparatus can include a mirror electrically coupled to a laser used for transmitting a first laser pulse generated by the laser in a first direction to yield a first reflected laser pulse and a second laser pulse generated by the laser in a second direction to yield a second reflected laser pulse. The apparatus can further include a receiver electrically coupled to the mirror positioned in the first direction of the mirror and receiving the first reflected laser pulse and positioned in the second direction of the mirror and receiving the second reflected laser pulse. The apparatus can also include an analog-to-digital converter electrically coupled to the receiver for digitizing the first reflected laser pulse to produce a first digital waveform and digitizing the second reflected laser pulse to produce a second digital waveform. The apparatus can also include a first correlator electrically coupled to the analog-to-digital converter for determining a first time of flight estimate of the first digital waveform and a second correlator electrically coupled to the analog-to-digital converter for determining a second time of flight estimate of the second digital waveform. The apparatus can include a processor electrically coupled to the first correlator and the second correlator, the processor processing the first time of flight estimate and the second time of flight estimate to determine a range of an object.

In another aspect, an apparatus can include a receiver receiving a plurality of radio frequency pulses, wherein each radio frequency pulse in the plurality of radio frequency pulses corresponds to a pixel. The apparatus can also include an analog-to-digital converter electrically coupled to the receiver, the analog-to-digital converter digitizing each radio frequency pulse into a corresponding digital waveform. The apparatus can include a plurality of correlators electrically coupled to the analog-to-digital converter, wherein each of the plurality of correlators determines a time of flight for the corresponding digital waveform. The apparatus can further include a processor electrically coupled to the plurality of correlators, the processor determining an image of an object, based in part on the time of flight determined by each of the plurality of correlators.

The method can include receiving, by a receiver, a plurality of radio frequency pulses, wherein each radio frequency pulse in the plurality of radio frequency pulses corresponds to a pixel. The method can further include digitizing, by an analog-to-digital converter, each radio frequency pulse into a corresponding digital waveform. The method can also include determining, by a plurality of correlators, a time of flight for the corresponding digital waveform and determining, by a processor, an image of an object, based in part on the time of flight determined by each of the plurality of correlators.

BRIEF DESCRIPTION OF THE DRAWINGS

The description will be more fully understood with reference to the following figures and charts, which are presented as various embodiments of the disclosure and should not be construed as a complete recitation of the scope of the disclosure, wherein:

FIG. 3 is a flow chart of a method for performing time of flight estimation of a laser pulse using LiDAR signal processing.

DETAILED DESCRIPTION

Aspects of the present disclosure involve systems, methods, devices and the like for performing time of flight estimation of a laser pulse using a LiDAR signal processing. In one aspect, a plurality of digital waveforms are correlated to a transmitted pulse for time of flight estimation. Each of the plurality of digital waveforms can be correlated independently by a corresponding correlator in a plurality of correlators. The plurality of correlators can work in parallel in order to determine time of flight estimates in real time. The system may be fine-tuned such that a desired speed may be accomplished by instantiating a corresponding number of correlators on a field-programmable gate array (FPGA).

In another aspect, each of the correlators can include signal processing modules for time of flight estimation. For example, noise may be extracted from the digital waveforms using a threshold module, which may be designed to ensure that the information received is real data by placing a threshold value on the signal which provides a minimum level of correlation that should be achieved to be considered valid. That is to say, the data received is analyzed to confirm a given correlation level is surpassed, otherwise the information is considered noise. As another example, the correlator can include a peak detect module which may be design to detect the peak in the digital waveform for comparison with the peak in the transmitted pulse.

Figure 1:
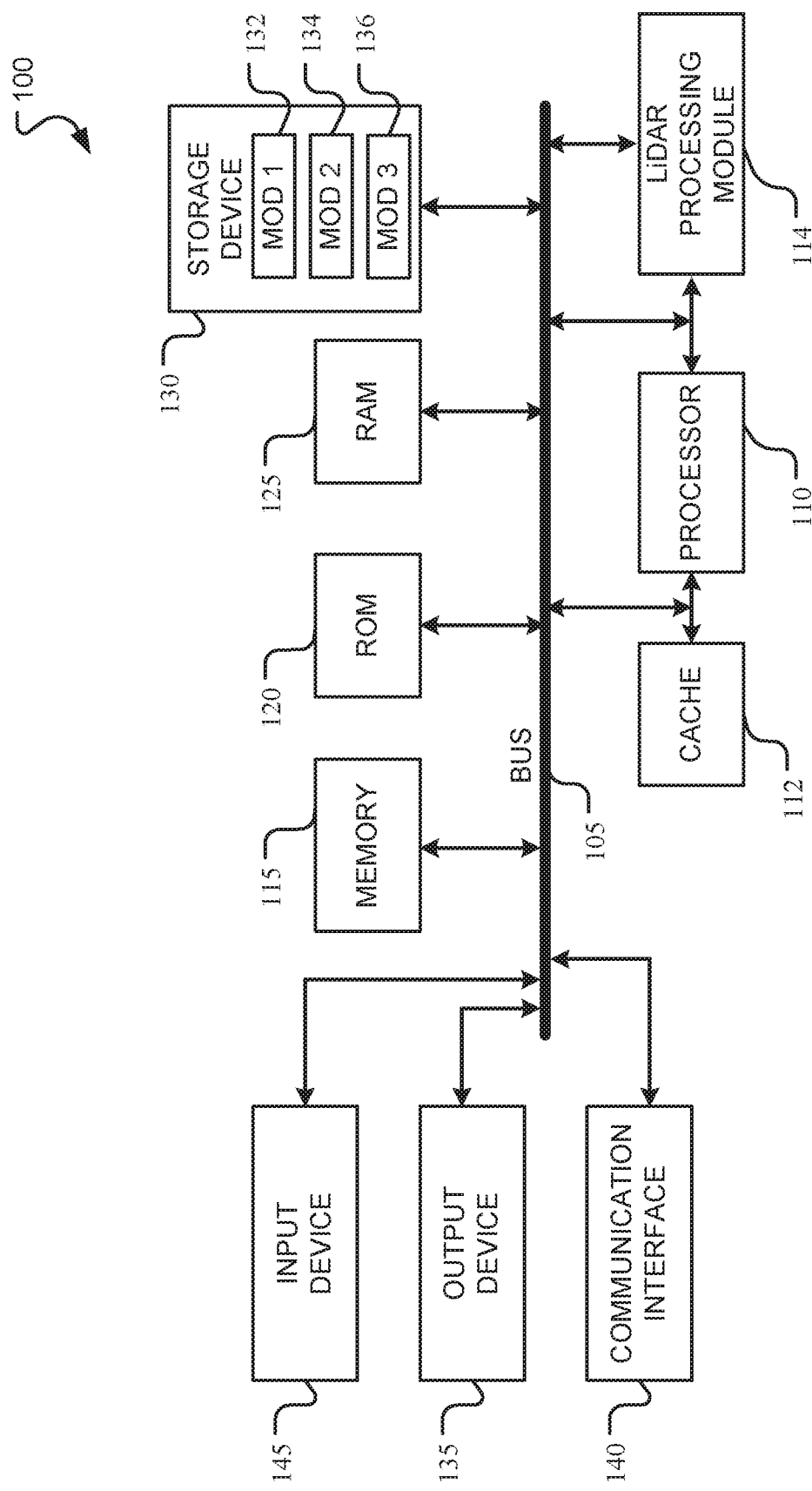
FIG. 1 is a diagram illustrating an example system architecture.

FIG. 1 is a diagram of an architecture 100 for performing time of flight estimation. Conventionally, radio interferometry architectures include radio frequency components which can be high powered components. The components can generate noise and heat which can lead to unreliable and/or unstable measurements. To overcome the heat and instability, multiple correlator components are introduced on an FPGA which can provide better signal stability for time of flight estimations.

FIG. 1 introduces the general architectural components for a system that can be used in performing time of flight estimation of a laser pulse using LiDAR signal processing. FIG. 1 discloses some basic hardware components that can apply to system examples of the present disclosure. An exemplary system and/or computing device 100 is introduced that includes a processing unit (CPU or processor) 110 and a system bus 105 that couples various system components, including the system memory 115, read only memory (ROM) 120, and random access memory (RAM) 125 to the processor 110. The system 100 can include a cache 112 of high-speed memory connected directly with, in close proximity to, or integrated as part of the processor 110. The system 100 copies data from the memory 115/120/125 and/or the storage device 130 to the cache 112 for quick access by the processor 110. In this way, the cache provides a performance boost that avoids processor 110 delays while waiting for data These and other modules can control or be configured to control the processor 110 in the performance of various operations or actions. Other system memory 115 may be available for use as well. The memory 115 can include multiple different types of memory with different performance characteristics. It can be appreciated that the disclosure may operate on a computing device 100 with more than one processor 110 or on a group or cluster of computing devices networked together to provide greater processing capability. The processor 110 can include any general purpose processor and a hardware module or software module, such as module 1 132, module 2 134, and module 3 136, stored in storage device 130, or standalone light detection and ranging (LiDAR) processing module 114 configured to control the processor 110 as well as a special-purpose processor where software instructions are incorporated into the processor. The processor 110 may be a self-contained computing system, containing multiple cores or processors, a bus, a memory controller, a cache, etc. A multi-core processor may be symmetric or asymmetric. The processor 110 can include multiple processors, such as a system having multiple, physically separate processors in different sockets, or a system having multiple processor cores on a single physical chip. Similarly, the processor 110 can include multiple distributed processors located in multiple separate computing devices, but working together such as via a communications network. Multiple processors or processor cores can share resources such as memory 115 or cache 112, or can operate using independent resources. The processor 110 can include one or more of a state machine, an application specific integrated circuit (ASIC), or a programmable gate array (PGA) including a field PGA.

The system bus 105 may be any of several types of bus structures, including a memory bus or memory controller, a peripheral bus, and a local bus using any of a variety of bus architectures. A basic input/output (BIOS) stored in ROM 120 or the like may provide a basic routine that helps to transfer information between elements within the computing device 100, such as during start-up. The computing device 100 further includes storage devices 130 or computer-readable storage media such as a hard disk drive, a magnetic disk drive, an optical disk drive, a tape drive, a solid-state drive, a RAM drive, a removable storage device, a redundant array of inexpensive disks (RAID), a hybrid storage device, or the like. The storage device 130 is connected to the system bus 105 by a drive interface. The drives and the associated computer-readable storage devices provide non-volatile storage of computer-readable instructions, data structures, program modules, and other data for the computing device 100. In one aspect, a hardware module that performs a particular function includes the software component stored in a tangible computer-readable storage device in connection with the necessary hardware components, such as the processor 110, bus 105, display (or any output device) 135, and so forth, to carry out a particular function. In another aspect, the system can use a processor and a computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 110 executes instructions to perform "operations," the processor 110 can perform the operations directly and/or facilitate, direct, or cooperate with another device or component to perform the operations.

Although the exemplary embodiment(s) described herein employs the hard disk 130, other types of computer-readable storage devices which can store data that are accessible by a computer, such as magnetic cassettes, flash memory cards, digital versatile disks (DVDs), cartridges, random access memories (RAMs) 125, read only memory (ROM) 120, a cable containing a bit stream and the like, may also be used in the exemplary operating environment. According to this disclosure, tangible computer-readable storage media, computer-readable storage devices, computer-readable storage media, and computer-readable memory devices expressly exclude media such as transitory waves, energy, carrier signals, electromagnetic waves, and signals per se.

To enable user interaction with the computing device 100, an input device 145 can be any number of input mechanisms, such as a microphone for speech, a touch-sensitive screen for gesture or graphical input, a keyboard, a mouse, a motion input, speech and so forth. An output device 135 can also be one or more of a number of output mechanisms known to those of skill in the art. In some instances, multimodal systems enable a user to provide multiple types of input to communicate with the computing device 100. The communications interface 140 generally governs and manages the user input and system output. There is no restriction on operating on any particular hardware arrangement, and therefore the basic hardware depicted may easily be substituted for improved hardware or firmware arrangements as they are developed.

For clarity of explanation, the illustrative system embodiment is presented as including individual functional blocks, including functional blocks labeled as a "processor" or processor 110. The functions of these blocks may be provided through the use of either shared or dedicated hardware, including, but not limited to, hardware capable of executing software and hardware, such as a processor 110, that is purpose-built to operate as an equivalent to software executing on a general purpose processor. For example, the functions of one or more processors presented in FIG. 1 can be provided by a single shared processor or multiple processors (use of the term "processor" should not be construed to refer exclusively to hardware capable of executing software). Illustrative embodiments may include microprocessor and/or digital signal processor (DSP) hardware, read-only memory (ROM) 120 for storing software performing the operations described below, and random access memory (RAM) 125 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer; (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 110 to perform particular functions according to the programming of the module. For example, FIG. 1 illustrates four modules: Mod1 132, Mod2 134, Mod3 136, and LiDAR processing module 114, which are configured to control the processor 110. These modules may be stored on the storage device 130 and loaded into RAM 125 or memory 115 at runtime or may be stored in other computer-readable memory locations. Alternatively, these modules may be standalone such as an independent breadboard with FPGAs mounted on it, (e.g., LiDAR processing module 114) for controlling the LiDAR signal processing.

LiDAR processing module 114 can use the computing device 100 of FIG. 1 or similar computer components to perform LiDAR signal processing and correlation. LiDAR processing module 114 can be one or more components as disclosed below and in conjunction with FIG. 2 for time of flight and object image estimation. For example, LiDAR processing module 114 can include a laser source, a microelectromechanical system (MEMS) mirror, a digitizer, correlators, waveform averaging components, serializer/deserializers, and the like for performing LiDAR signal processing. Additionally or alternatively, LiDAR processing module 114 can independently process or work jointly with processor 110 for determining the time of light of the laser pulses emitted by the laser in order to obtain range and image of an object.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 110 can include all types of processors disclosed herein, including a virtual processor. However, when referring to a virtual processor, the processor 110 includes the software components associated with executing the virtual processor in a virtualization layer and the underlying hardware necessary to execute the virtualization layer. The system 100 can include a physical or virtual processor 110 that receives instructions stored in a computer-readable storage device, which can cause the processor 110 to perform certain operations. When referring to a virtual processor 110, the system also includes the underlying physical hardware executing the virtual processor 110.

In some embodiments, the core processing unit in the system can be the Goddard Space Flight Center (GSFC)-developed SpaceCube, a hybrid computing platform designed to provide command and data handling functions for earth-orbiting satellites. The SpaceCube includes five slices (cards): two Power Slices, two Processor Slices, and one Video Control Module (VCM) Slice. Other configurations are possible. Each processor slice contains two Xilinx Virtex Field Programmable Gate Arrays (FPGAs), and each FPGA contains two PPC405 processors running at 250 MHz. These eight processors host multiple instantiations of the system pose application FPose, along with command and telemetry handling software that allows a flight-like ground terminal to control the system remotely. The VCM provides sensor data compression and 16 Gb of flash memory to store raw sensor images for later playback. The Argon SpaceCube is an engineering development unit (EDU) version of the hardware own on the (Relative Navigation Sensor) RNS experiment and Materials International Space Station Experiment.

Figure 2:
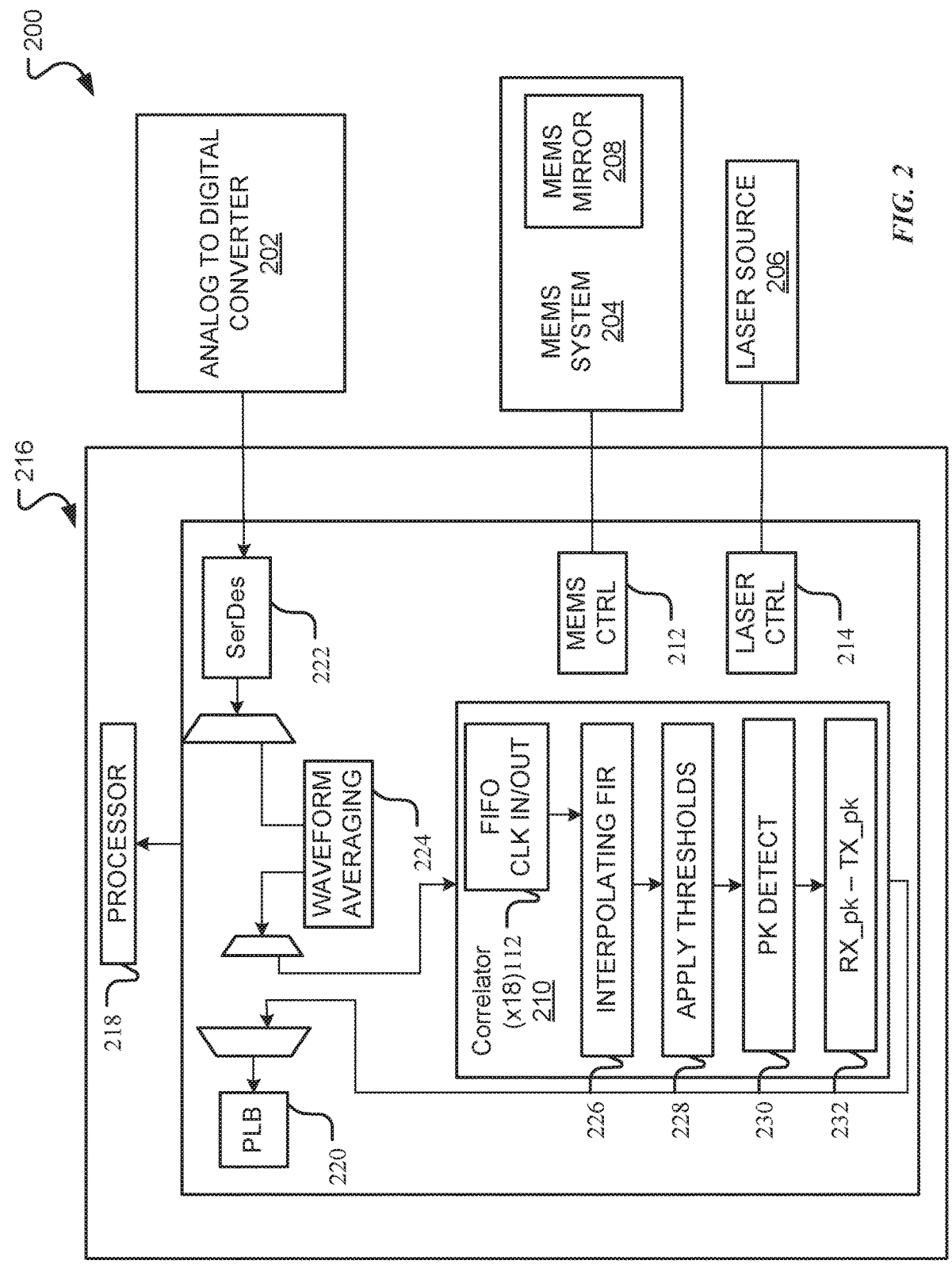
FIG. 2 is a block diagram illustrating a system for performing time of flight estimation of a laser pulse using LiDAR signal processing.

As indicated, FIG. 1 introduces the general architectural components and specifically the use of LiDAR processing module 114 for performing flight time estimation using LiDAR signal processing. FIG. 2 discloses a block diagram of a system 200 for performing such estimation. In some instances, optical signal module 114 can perform some or all of the LiDAR signal processing functions/operations described herein. For example, in one embodiment, system 200 can be a standalone component (e.g., breadboard) that includes a laser source 206 that generates light pulses that then get reflected, digitized by an analog-to-digital converter (ADC) 202 and measured using correlators 210 located in an integrated circuit (IC) 216 to determine time of flight estimations that can be used to obtain a range of an object. In particular, system 200 can be used to process images in real time by creating many parallel blocks of digital correlators within the IC 216 which provide the high throughput that enables the real time estimations and image scans with six degrees of freedom. Alternatively, system 200 can include separate modules which can include the ADC 202, microelectromechanical systems (MEMS) 204, and laser source 206, while IC 216 resides on an independent breadboard.

As conventionally understood, LiDAR includes the emission of laser pulses of light used to determine the range to a distant object. The distance to the object is determined by measuring the time delay between the emission of the laser pulse of light and the detection of the reflected signal using a correlator. System 200 illustrates the use of laser source 206 which may create the laser pulse. In one implementation, a LiDAR system a mirror may be used to guide the laser pulse in a specific direction. In a particular implementation, a MEMS mirror 208, which may be located in microelectromechanical system (MEMS) 204, may be used for guiding the laser pulse. The MEMS system 204 may include the MEMS mirror 208 and any other control that may be required to position the mirror such that the laser pulse generated by the laser source 206 is transmitted in a desired direction towards the object at a distance. In one embodiment, the laser pulse can be used to represent one pixel on the object. A slight movement of the MEMS mirror 208 can then be used to position the transmission of the laser pulse in a second direction to capture a second pixel. Therefore, to obtain detailed measurements of the object, multiple laser pulses may be transmitted such that the MEMS mirror 208 is moved slightly as a next pulse is transmitted, the next pixel is measured. In the current embodiment, the mirror may continue to move ever so slightly in a round robin manner such that every slight move from the mirror represents a new pixel.

As the pulse is transmitted toward an object, the signal is reflected and captured by a receiver (not shown) and transmitted to the analog-to-digital converter 202. The incoming signal/waveform is captured and digitized by the analog-to-digital converter 202 in preparation for processing. In one embodiment, the analog-to-digital converter 202 can be a high speed converter which can sample two channels with about 512 samples each. For example, the high speed digital converter can sample a pixel every 5 microsecs, capturing both the waveform's in-phase and quadrature components.

The sampled data can then be stored in a first-in first-out (FIFO) buffer 234 before being processed by correlator(s) 210. The FIFO buffer 234 may be filled with the captured data from the analog-to-digital converter 202 and stored such that it can be clocked out sample by sample to an interpolating finite impulse response (FIR) filter 226 located in correlator 210. An FIR filter may be a filter that is used to find coefficients and filter order that meets certain criteria. For example. Interpolating FIR 216 can be designed to interpolate the samples by a factor of 16 in order to improve range or time resolution in time of flight estimate. Further, the interpolating FIR 216 can be implemented as a matched filter.

Next, to ensure the samples processed are real data and not noise, the data gets processed through an apply thresholds module 228. Apply threshold module 228, is a module that may be designed to ensure that the information received is real data, by placing a threshold value on the signal which provides a minimum level of correlation that should be achieved to be considered valid. That is to say, the data received is analyzed to confirm a given correlation level is surpassed otherwise the information is considered noise. In one example, different levels of validity may be applied for the in-phase and quadrature samples, as different noise levels may exist.

Once the samples filtered are confirmed to be real data, the data is processed to select the highest peak in 230. That is to say, the highest peak from the filtered samples is detected and used to compare against an ideal Gaussian (in RX_pk-TX_pk 232). In some instances, the transmitted laser pulse may be an ideal Gaussian pulse therefore, a peak from an ideal pulse (TX_pk) may be compared against the received sampled peak (RX_pk) which can then be analyzed to determine an object range and image. In some instances, highest peak as well as the lowest and mid peak may be identified. This may be especially useful in applications where foliage penetration is necessary. Further, in one implementation, the ideal transmitted pulse and received samples can be compared and concatenated into the same waveform and fed into correlator 210 for an improved time of flight estimation. If a good signal to ratio is achieved, then jitter that may be generated by triggering the laser pulse may be subtracted and estimation improved.

Note that this process may be repeated for each incoming reflected signal corresponding to a transmitted pulse. As indicated, each pulse represents a pixel in an object and thus many pulses may be transmitted, reflected, and correlated. In one specific embodiment, numerous correlators may operate in parallel providing the ability to extract time of flight estimates in real time. In this embodiment, the system may be fine-tuned such that the speed desired may be accomplished by instantiating multiple copies of correlator 210 on a field-programmable gate array (FPGA). For example, in one design, four correlators may run in parallel to achieve 20 pixels per microsecond. In another example, eighteen correlators may be used to process 200,000 pixels per microsecond. Still yet in another example, eighty correlators may be used to process 4 million pixels per microsecond.

In some instances, prior to entering the correlator 210, the digitized samples may be processed by a waveform averaging module 224. The waveform averaging module 224 may be designed to average a predetermined number of waveforms in order to reduce the received noise. By reducing noise in the received waveforms (digitized samples), the signal-to-noise ratio (SNR) can be increased and jitter reduced so that cleaner data can be processed by the correlators 210, producing an image with increased resolution.

Additionally, other modules and/or controls may be located within IC 216 to aid in the processing of the LiDAR signal for image range detection and time of flight estimation. For example, MEMS controller 212 and laser controller 214 may be present in IC 216 to help control functions such as the direction of the MEMS mirror 208 within MEMS system 204 and frequency of the laser pulse deriving from the laser source 206. Further, MEMS controller 212 and laser controller 214 can provide an interface between external modules (e.g., 204, 206) and the IC 216. As another example, SerDes 222 may also be present in IC 216 which can help in the serializing and/or deserializing of the waveform arriving from the receiver and digitized by the analog-to-digital converter 202. Further components can be included in IC 216 including processors 218 and PLBs 220, in addition to others not illustrated in FIG. 2 which are commonly known in the art.

FIG. 3 is a flowchart of the various operations of the presently disclosed technology. Specifically, FIG. 3 is a flow chart of a method for performing time of flight estimation of a laser pulse using LiDAR signal processing. Method 300 begins with operation 302, a reflected radio frequency (RF) pulse is received at a receiver. The reflected RF pulse may derive from the reflection of an object being scanned at a distance. In some instances, a laser pulse can be transmitted and guided by a MEMS mirror in the direction of the object for LiDAR signal processing and scanning. In these instances, the received reflected RF pulse can represent one pixel on the object at a distance. However, in other instances the reflected RF pulse can represent more than one pixel and/or multiple reflected RF pulses can be received.

Once the reflected pulse has been received, method 300 continues to operation 304, Where the RF signal gets digitized for processing. The digitizing can occur using an analog-to-digital converter. The analog-to-digital converter may be a standalone with an interface coupling an IC where the signal processing including signal correlation can occur. Further, the analog-to-digital converter may be coupled to a SerDes for serializing/deserializing the digital waveform. In addition, the analog-to-digital converter may digitize the waveform into in-phase and quadrature components.

In operation 306, the digital waveform is sent to a correlator for processing. The correlator receiving the waveform may be one of multiple correlators running in parallel on an FPGA. Further, each correlator can process a pixel. In the correlator, multiple modules may be present to process the digitized waveform in order to obtain time of flight estimations and achieve 3-D image scanning of the object at a distance. The multiple modules can include an interpolating FIR may function as a matched filter designed to interpolate the samples by a predetermined factor in order to improve range or time resolution in time of flight estimate. In addition, an apply thresholds module can also exist, which is a module that may be designed to ensure that the information received is real data, by placing a threshold value on the signal which provides a minimum level of correlation that should be achieved to be considered valid. That is to say, the data received is analyzed to confirm a given correlation level is surpassed otherwise the information is considered noise. Once the data is clear of noise, the peak is detected and compared against the transmitted pulse (e.g., ideal Gaussian pulse) which can then be analyzed to determine an object image and pulse time of flight in operation 308. In some instances, more than one peak may be detected and compared for closer correlation approximation. In some instances, an averaging waveform module may also be used prior to the correlator which may be used to average a predetermined number of waveforms in order to reduce the received noise. By reducing noise in the received waveforms (digitized samples), the signal-to-noise ratio (SNR) can be increased and jitter reduced so that cleaner data can be processed by the correlators 210, producing an image with increased resolution.

Once the received RF pulse has been processed, the LiDAR system can determine in another reflected RF pulse has been detected at operation 310. If indeed a new pulse has been detected, then the process returns to operation 302, where the reflected RF pulse is received and then processed by the analog-to-digital converter and correlator for time of flight estimations in operations 304-308. In one embodiment, the next RF pulse received is processed by the next correlator working in parallel with the prior correlator. In some instances, four, eighteen, or even eighty correlators can be used in parallel for processing the image and obtaining real time object range estimates by obtaining time of flight estimates. The correlators can work in a round robin manner such that each correlator is processing the next incoming pixel of the object at a distance in the form of a reflected RF pulse. Alternatively, if no more RF pulses are detected, the process can continue to operation 312, where the measurement data from the correlators is interrogated and post-processed to determine the scanned image and range.

Note that the LiDAR processing scheme presented in FIGS. 2-3 is a possible example for performing time of flight estimations using LiDAR signal processing that may be employed or be configured in accordance with aspects of the present disclosure. It will be appreciated that other configurations may be utilized.

In the present disclosure, the methods disclosed may be implemented as sets of instructions in hardware or software. It may be further understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An apparatus comprising:
a receiver receiving a plurality of reflected laser pulses, wherein each laser pulse corresponds to a pixel, said receiver converting the received laser pulses to electrical radio frequency (RF) pulses and amplifying them;
an analog-to-digital converter electrically coupled to the receiver, the analog-to-digital converter digitizing each radio frequency pulse into a corresponding digital waveform;
a plurality of correlators instantiated on a single field-programmable gate array (FPGA) and electrically coupled to the analog-to-digital converter, wherein each of the plurality of correlators determines a time of flight for the corresponding digital waveform; and
a processor electrically coupled to the plurality of correlators, the processor determining an image of an object, based in part on the time of flight determined by each of the plurality of correlators; wherein
each of the correlators in the plurality of correlators includes an first interpolating finite impulse response (FIR) filter for filtering the corresponding digital waveform to improve a time resolution of the time of flight estimate;
each of the correlators in the plurality of correlators includes an apply thresholds module for applying a threshold value to the corresponding filtered digital waveform to ensure information data is being processed;
each of the correlators in the plurality of correlators includes a peak detect module for detecting a peak in the filtered digital waveform to compare against a peak in a transmitted laser pulse generated by a laser; and
said plurality of laser pulses are generated by the laser and transmitted by a rotating mirror and reflected towards said receiver.

2. The apparatus of claim 1, wherein the plurality of correlators are one of four, eighteen, and eighty correlators working in parallel.

3. The apparatus of claim 1, further comprising:
a waveform averaging module electrically coupled to the analog-to-digital converter and the plurality of correlators, the waveform averaging module averaging a predetermined number of the corresponding digital waveforms into an averaged digital waveform to reduce received noise, and wherein the waveform averaging module continues averaging the corresponding digital waveforms from the analog-to-digital converter.

4. The apparatus of claim 3, wherein each of the averaged digital waveforms is correlated by a corresponding correlator from the plurality of correlators to determine the time of flight.

5. The apparatus of claim 1, An apparatus comprising:
a receiver receiving a plurality of reflected laser pulses, wherein each laser pulse corresponds to a pixel, said receiver converting the received laser pulses to electrical radio frequency (RF) pulses and amplifying them;
an analog-to-digital converter electrically coupled to the receiver, the analog-to-digital converter digitizing each radio frequency pulse into a corresponding digital waveform;

a plurality of correlators electrically coupled to the analog-to-digital converter, wherein each of the plurality of correlators determines a time of flight for the corresponding digital waveform; and a processor electrically coupled to the plurality of correlators, the processor determining an image of an object based in part on the time of flight determined by each of the plurality of correlators; wherein each of the correlators in the plurality of correlators includes an first interpolating finite impulse response (FIR) filter for filtering the corresponding digital waveform to improve a time resolution of the time of flight estimate;

each of the correlators in the plurality of correlators includes an apply thresholds module for applying a threshold value to the corresponding filtered digital waveform to ensure information data is being processed;

each of the correlators in the plurality of correlators includes a peak detect module for detecting a peak in the filtered digital waveform to compare against a peak in a transmitted laser pulse generated by a laser; and said plurality of laser pulses are generated by the laser and transmitted by a rotating mirror and reflected towards said receiver; wherein the rotating mirror rotates in a round robin manner for each laser pulse in the plurality of laser pulses.

6. A method comprising:

receiving, by a receiver, a plurality of reflected laser pulses, wherein each laser pulse corresponds to a pixel plurality of radio frequency pulses;

converting the received laser pulses to electrical radio frequency (RF) pulses and amplifying them;

digitizing, by an analog-to-digital converter, each radio frequency pulse into a corresponding digital waveform;

instantiating a plurality of correlators on a single field-programmable gate array;

determining, a said plurality of correlators, a time of flight for the corresponding digital waveform; and determining, by a processor, an image of an object, based in part on the time of flight determined by each of the plurality of correlators; wherein each of the correlators in the plurality of correlators includes an first interpolating finite impulse response (FIR) filter for filtering the corresponding digital waveform to improve a time resolution of the time of flight estimate;

each of the correlators in the plurality of correlators includes an apply thresholds module for applying a threshold value to the corresponding filtered digital waveform to ensure information data is being processed;

each of the correlators in the plurality of correlators includes a peak detect module for detecting a peak in the filtered digital waveform to compare against a peak in a transmitted laser pulse generated by a laser; and said plurality of laser pulses are generated by the laser and transmitted by a rotating mirror, wherein the plurality of laser pulses are reflected towards said receiver.

7. The method of claim 6, wherein the plurality of correlators are one of four, eighteen, and eighty correlators working in parallel.

* * * * *